US012692167B2

(12) United States Patent
Wolff et al.

(10) Patent No.: US 12,692,167 B2
(45) Date of Patent: Jul. 28, 2026

(54) METHOD FOR PRODUCING POLYCRYSTALLINE SILICON

(71) Applicant: WACKER CHEMIE AG, Munich (DE)

(72) Inventors: Jürgen Wolff, Radeberg (DE); Markus Wenzeis, Wurmannsquick (DE)

(73) Assignee: Wacker Chemie AG, Munich (DE)

( * ) Notice: Subject to any disclaimer, the term of this patent is extended or adjusted under 35 U.S.C. 154(b) by 798 days.

(21) Appl. No.: 17/627,323

(22) PCT Filed: Jul. 16, 2019

(86) PCT No.: PCT/EP2019/069110
§ 371 (c)(1),
(2) Date: Jan. 14, 2022

(87) PCT Pub. No.: WO2021/008693
PCT Pub. Date: Jan. 21, 2021

(65) Prior Publication Data
US 2022/0274839 A1     Sep. 1, 2022

(51) Int. Cl.
*C01B 33/035*     (2006.01)
*B01J 8/42*     (2006.01)
*B01J 19/00*     (2006.01)

(52) U.S. Cl.
CPC .............. *C01B 33/035* (2013.01); *B01J 8/42* (2013.01); *B01J 19/0013* (2013.01);
(Continued)

(58) Field of Classification Search
CPC .......... B01J 19/0013; B01J 2208/00017; B01J 2219/00162; B01J 2219/00164; B01J 2219/00186; B01J 8/42; C01B 33/035
See application file for complete search history.

(56) References Cited

U.S. PATENT DOCUMENTS 3,809,571 A * 5/1974 Berlat ................... C01B 33/035
                                                  427/255.17
4,900,411 A 2/1990 Poong et al.
(Continued)

FOREIGN PATENT DOCUMENTS

CN 102031558 A 4/2011
CN 101311351 B 8/2011
(Continued)

OTHER PUBLICATIONS

Habuka et al. J. Electrochem. Soc. 1997, 144, 3261 (Year: 1997).*
(Continued)

*Primary Examiner* — Sally A Merkling
*Assistant Examiner* — Jordan W Taylor

(57) ABSTRACT

A process for producing polycrystalline silicon and a gas phase deposition chamber for the same. The process includes introducing a reaction gas containing an amount of silane and/or an amount of at least one halosilane as well as an amount of hydrogen into a reaction space of a gas phase deposition reactor. The reaction space includes at least one heated support body upon which by deposition silicon is deposited to form the polycrystalline silicon. For the detection of dust depositions, at least one measuring apparatus is used to determine the amount of haze inside the reaction space during deposition.

10 Claims, 2 Drawing Sheets

(52) U.S. Cl.
CPC ................ *B01J 2219/00162* (2013.01); *B01J 2219/00164* (2013.01); *B01J 2219/00186* (2013.01)

(56) References Cited

U.S. PATENT DOCUMENTS

| | | | | |
|---|---|---|---|---|
| 5,288,364 | A | 2/1994 | Burt et al. | |
| 7,589,031 | B2 * | 9/2009 | Anwar | C23C 16/345 |
| | | | | 257/E21.101 |
| 2012/0085284 | A1 * | 4/2012 | Dassel | C01B 33/035 |
| | | | | 118/716 |
| 2012/0322175 | A1 * | 12/2012 | Pazzaglia | C23C 16/52 |
| | | | | 118/712 |
| 2013/0017139 | A1 * | 1/2013 | Rigon | C23C 16/24 |
| | | | | 422/187 |
| 2014/0105806 | A1 * | 4/2014 | Sofin | C01B 33/035 |
| | | | | 423/350 |
| 2017/0167016 | A1 | 6/2017 | Oh et al. | |

FOREIGN PATENT DOCUMENTS

| | | | |
|---|---|---|---|
| CN | 101597060 | B  * | 5/2012 |
| CN | 102557038 | A | 7/2012 |
| CN | 109467089 | A | 3/2019 |
| CN | 109542003 | A | 3/2019 |
| EP | 0896952 | A1 | 2/1999 |
| EP | 2077252 | A2 | 7/2009 |
| EP | 2266923 | A2 | 12/2010 |
| EP | 2444373 | A1 | 4/2012 |
| EP | 2662335 | A1 | 11/2013 |
| EP | 2719663 | A1 | 4/2014 |
| JP | 2013224254 | A | 10/2013 |
| KR | 101739206 | B1 | 5/2017 |
| WO | 2019110091 | A1 | 6/2019 |

OTHER PUBLICATIONS

Mesnik, Thermal vs. Optical IP Camera, Kintronics, Jun. 21, 2016 (Year: 2016).*

Yasuda, Photometer, Encyclopedia of Microfluidics and Nanofluidics, 2714-2721, Jan. 1, 2015 (Year: 2015).*

Kamins, J.Electrochem.Soc. 1972, 119, 112 (Year: 1972).*

Min et al. CN101597060B English Translation (Year: 2012).*

* cited by examiner

METHOD FOR PRODUCING POLYCRYSTALLINE SILICON

CROSS-REFERENCE TO RELATED APPLICATIONS

This application is a U.S. National Phase application of PCT Application No. PCT/EP2019/069110 filed on Jul. 16, 2019 the disclosure of which is incorporated by reference herein in its entirety.

The invention relates to a process for producing polycrystalline silicon in a gas phase deposition reactor, wherein to avoid dust depositions at least one measuring apparatus is used to determine the haze inside the reaction space of the reactor during the deposition.

Polycrystalline silicon (polysilicon) is used as a starting material in the production of single-crystal (monocrystalline) silicon, for example by means of crucible pulling (Czochralski or CZ process) or by means of zone melting (float zone process). In the semiconductor industry single-crystal silicon is used for the manufacture of electronic components (chips).

Polysilicon is further needed for the production of multicrystalline silicon, for example by means of block casting processes. The multicrystalline silicon obtained in the form of a block may be used for the manufacture of solar cells.

Polysilicon is obtainable for example by the Siemens process—a chemical gas phase deposition process. This comprises heating in a bell-shaped reactor (Siemens reactor) support bodies (usually composed of polysilicon) by direct passage of current and introducing a reaction gas containing a silicon-containing component and hydrogen. The silicon-containing component is generally monosilane ($SiH_4$) or a halosilane of general composition $SiH_nX_{4-n}$ ($n=0, 1, 2, 3$; $X=Cl$, Br, I). It is typically a chlorosilane or chlorosilane mixture, usually trichlorosilane ($SiHCl_3$, TCS). $SiH_4$ or TCS in admixture with hydrogen is predominantly employed. The construction of a typical Siemens reactor is described in EP 2 077 252 A2 or EP 2 444 373 A1 for example. The floor of the reactor (floor plate) is generally provided with electrodes which receive the support bodies. The support bodies are generally filament rods (slim rods) made of silicon. Typically, two filament rods are joined with a bridge (made of silicon) to afford a rod pair which forms an electrical circuit via the electrodes. The surface temperature of the filament rods is typically more than 1000° C. during the deposition. At these temperatures the silicon-containing component of the reaction gas decomposes and elemental silicon is deposited from the gas phase as polysilicon. This causes the diameter of the filament rods and the bridge to increase. After achieving a specified diameter of the rods the deposition is typically terminated and the obtained polysilicon rods are deinstalled. After removal of the bridge approximately cylindrical silicon rods are obtained.

Polysilicon may further be produced in the form of granulate in a fluidized bed reactor. This is achieved by fluidization of silicon seed particles by means of a gas flow in a fluidized bed, wherein said flow is heated to high temperatures via a heating apparatus. Addition of a silicon-containing reaction gas results in a deposition reaction at the hot particle surface and elemental silicon is deposited on the seed particles. The seed particles thus increase in diameter. Regular withdrawal of particles that have grown in diameter and addition of further silicon seed particles allows the process to be operated continuously. Employable silicon-containing reaction gases include silicon-halogen compounds (for example chlorosilanes or bromosilanes), monosilane ($SiH_4$) and mixtures of these gases with hydrogen. A typical fluidized bed reactor for producing polysilicon is described for example in U.S. Pat. No. 4,900,411A.

In the deposition of polysilicon, in particular in the Siemens process, unwanted dust depositions may occur for a wide variety of reasons. These reasons include inter alia: reaction gas having too high a proportion of halosilane; an increase in the proportion of unwanted silanes (for example dichlorosilane); occurrence of local gas temperature differences in the reaction space or local temperature differences of the support bodies (especially surface temperature), generally due to varying gas flows.

In the deposition of polysilicon two competing processes, namely silicon deposition on the surface of rods/silicon granulate and the formation of free particles (dust deposition), are generally in equilibrium. The free particles formed may differ depending on the type of the reactor and the reaction conditions and their composition may vary from pure silicon (amorphous to crystalline) right through to complex compounds of general formula $Si_xCl_yH_z$.

The particles formed by dust deposition are normally distributed over the entire reaction space with the gas flow and settle on the rods/the silicon granulate and especially the inner reactor wall. The particles deposited on the rods or the granulate may in some cases be overgrown by newly formed layers in the course of the further deposition and thus integrated into the polysilicon product. Dust depositions therefore generally lead to product downgrading and production losses. The particles deposited on the reactor wall and in particular also in the process equipment arranged downstream of the reactor (for example heat exchangers, filters) form over time an ever thicker coating requiring removal from time to time. This increases the time in which the reactor is idle and results in higher production costs. A cleaning of the inner reactor wall is in some cases even required between every batch change. Damage due to blockages and short cleaning intervals can result in costly plant idling.

Detection of dust depositions has hitherto comprised performing visual monitoring at sightglasses in the reactor wall at regular intervals, wherein dust depositions are to be detected with the naked eye by hazing of the reaction space. However, dust deposition is generally only unambiguously detectable in an advanced state, i.e. at a point in time at which the purity of the polysilicon product has already been impaired. Furthermore, seamless monitoring is associated with high personnel costs. Dust depositions are fundamentally not detected in due time, with the result that the product must be downgraded or even discarded.

While the risk of dust depositions may in principle be minimized by optimized process management, dust depositions nevertheless keep occurring. Dust deposition may be countered by immediate adapting of process parameters. It would therefore be desirable to be able to detect dust depositions as early as possible. The present invention accordingly has for its object to provide a process that allows detection of dust depositions even during their formation.

This object is achieved by a process for producing polycrystalline silicon comprising introducing a reaction gas containing silane and/or at least one halosilane as well as hydrogen into a reaction space of a gas phase deposition reactor, wherein the reaction space comprises at least one heated support body upon which by deposition silicon is deposited to form the polycrystalline silicon. For early detection of dust depositions at least one measuring apparatus is used to determine the haze inside the reaction space during the deposition.

At commencement of a dust deposition particles having an average size of about 100 nm are formed. In an advanced dust deposition these particles may have an average size of about 10 μm. The particle size in dust depositions is typically in a range from 100 nm and to 10 μm. These particles absorb and scatter electromagnetic radiation, especially in the visible and infrared range. It is immaterial whether the source of the electromagnetic radiation is the heated support body itself or an external light source, i.e. a light source arranged outside the reaction space. Haze is in principle detected on account of an increasing number of particles in the gas atmosphere in the reaction space and an accompanying change in the penetrating electromagnetic radiation (for example direction, scattering, absorption, intensity).

The measuring apparatus as more particularly described hereinbelow enables early detection of dust depositions. Consequently, targeted countermeasures (especially altering of process parameters) may be used to avoid contamination of the polysilicon and the formation of coatings on process equipment (for example reactor inner wall, filters, heat exchangers, pipes). Such countermeasures may in principle be effected manually or automatically. The deposition may especially be controlled based on (continuous or discontinuous) determination of haze.

The gas phase deposition reactor is preferably a Siemens reactor. Accordingly the heated support body is preferably two slim rods made of silicon connected via a bridge made of silicon to afford a rod pair, wherein the two free ends of the rod pair are connected to electrodes on the reactor floor. Heating of the support body is thus typically effected by passage of current (Joule heating). The diameter of the support body increases over the course of the deposition as a result of the deposited silicon. The number of silicon rods/silicon rod pairs arranged in the reaction space is generally immaterial to the performance of the process according to the invention. The gas phase deposition reactor is in particular a Siemens reactor such as is described in the introduction and for example in EP 2 662 335 A1. Typical examples of the number of silicon rods in a reactor are 36 (18 rod pairs), 48 (24 rod pairs), 54 (27 rod pairs), 72 (36 rod pairs) or even 96 (48 rod pairs). At any point in the deposition the silicon rods may be described to a good approximation as cylindrical. This approximation is generally independent of whether the slim rods are cylindrical or, for example, square.

The gas phase deposition reactor may also be a fluidized bed reactor for producing polysilicon granulate as described in the introduction for example. Accordingly the heated support body may be the fluidized silicon seed particles or the granulate particles grown therefrom by deposition of silicon. The silicon seed particles/the granulate particles formed therefrom by deposition have a size of about 0.5 to 5 mm and are therefore generally much larger than the particles formed in a dust deposition and detection of haze is therefore possible even in the fluidized bed or at least in the edge regions of the fluidized bed. The support body is in this case typically heated via a heating apparatus outside the reaction space. Heating may also be effected with a heater introduced into the reaction space.

In a preferred embodiment the measuring apparatus for determining the haze in the reaction space comprises a scattered radiation detector and/or extinction detector.

In addition to the scattered radiation detector and/or extinction detector the measuring apparatus may comprise at least one external source of electromagnetic radiation, especially a light source and/or laser, which is preferably arranged outside the reactor, for example in front of a sightglass. The term "external source" is to be understood as meaning that it is not solely the electromagnetic radiation emitted from the heated support body that is detected. The scattered radiation and/or extinction detector thus detects in particular the electromagnetic radiation which originates from the external source, and may be scattered and attenuated, after a measurement path. This measurement path corresponds to the distance between the external source and the detector. The external source preferably emits radiation having wavelengths or a wavelength distinct from the typical wavelengths of the emission spectrum of silicon. This ensures discriminability of measurement radiation (of the external source) from the radiation emitted by the heated support body.

The detectors are preferably arranged outside the reactor, for example in front of a sightglass in the reactor wall. The extinction detector is always located opposite the external source, so that the radiation is directed directly onto the detector. The scattered radiation detector is typically arranged at an angle to the emitted radiation. It is also possible for a plurality of scattered radiation detectors to be arranged at different angles to the radiation. The measurement path passes through the reaction space and may correspond for example to the internal diameter of the reaction space. The measuring apparatus is preferably a combination of a scattered radiation detector and an extinction detector. A typical arrangement of a measuring apparatus comprising a scattered radiation detector and an extinction detector is shown in FIG. 1.

An external/additional source of electromagnetic radiation to determine the haze may in principle be eschewed since the heated support body itself is a source of electromagnetic radiation (wavelength range from about 100 to 2000 nm). This radiation may be detected during the deposition with a detector which is in principle also suitable as an extinction or scattered radiation sensor. During dust deposition the radiation emitted by the support body is attenuated both by absorption and by scattering. Attenuation of the radiation emitted by the support body thus makes it possible to detect dust deposition. A typical arrangement of a measuring apparatus without an external source of electromagnetic radiation is shown in FIG. 2.

The measuring apparatus may comprise an optical camera. The measuring apparatus may especially be an optical camera. For example the optical camera may comprise a radiation sensor array with a downstream imaging process. The haze is determined as a change in the quality of the images generated with the camera. Alternatively or in addition the haze may also be determined as a change in manipulated variables for establishing an optimal image quality. Since a camera is in principle also a detector of electromagnetic radiation reference may also be made to the explanations in connection with FIG. 2.

The camera may be a black-and-white camera or a color camera for example. It is preferably a digital camera.

Change in quality of the images generated with the camera may be reflected for example in a change in image sharpness, resolution, contrast, color distribution and or grayscale. Such changes are preferably evaluated using image processing software.

It is typically observable during dust deposition that the reactor interior becomes hazier and darker (graying of the image). Thus for example the edge and surface contours of silicon rod support bodies become blurred. Such changes in the camera image may be detected and evaluated for example using image pixel software.

Each pixel may in principle be assigned a numerical value according to radiation intensity. Comparing these values with preceding values or with a normal makes it possible to draw conclusions about haze. If for example no haze is present the value gradient at the edge of a silicon rod is steep. In the presence of a haze the gradient flattens and the overall value change is reduced in magnitude. In the presence of a haze the values generally reduce since the intensity of the radiation incident on the sensor is reduced as a consequence of the haze.

A grayscale difference may also be determined after two consecutive image recordings. If the determined value exceeds a certain threshold value, countermeasures may be introduced.

The manipulated variables for establishing an optimal image quality may be for example exposure time, f-number, and/or the ISO value. For example an automatic control system implemented in the camera may be adjusted to produce the most optimal possible images of the reactor interior. Accordingly the exposure time is adjusted according to the incident radiation. Upon onset of dust deposition and accompanying haze a higher exposure time is generally required. Countermeasures may then be introduced upon exceeding a threshold value for exposure time.

Determination of haze with a camera may be advantageous especially in the Siemens process since the thickness and/or the distances of the silicon rods from one another and optionally the silicon rod temperature are generally determined using a black-and-white camera or a thermal imaging camera in any event. Reference may be made here to WO2019/110091A1. Modifications or installation of new measuring apparatuses is thus in principle not necessary for haze detection.

In a further embodiment the measuring apparatus comprises a temperature sensor, wherein the haze is preferably determined as a change in temperature. The measuring apparatus is especially a temperature sensor.

The temperature sensor is preferably selected from the group comprising pyrometer (radiation thermometer), thermal imaging camera, thermocouple and combinations thereof.

In the case of the gas phase deposition reactors, especially in the case of Siemens reactors, the temperature in the reaction space is typically monitored as standard. For example in the Siemens process the temperature of the support bodies (silicon rods) is measured with a pyrometer or a thermal imaging camera and serves as an important responding variable during the deposition.

Pyrometers and thermal imaging cameras comprise a detector which measures the electromagnetic radiation emitted by the support body and optionally its environment. As also shown in FIG. 2 the measurement is normally carried out from outside the reactor. Occurrence of dust deposition and the accompanying haze acts as a disruptive variable on temperature measurement. The radiation arriving at the detector is attenuated and the expected measured temperature value is accordingly a false excessively low reading. This false reading may generally be perpetuated in many parameters of a closed-loop control circuit as a consequence of control engineering mathematical relations. Accordingly, these descendent parameters and their deviations from a normal value may also be used to detect dust deposition.

The average temperature of silicon particles (support bodies) in the reaction zone of a fluidized bed reactor may be measured for example with an infrared pyrometer as described in EP 0 896 952 A1.

The measuring apparatus may in particular be a combination of optical camera and temperature sensor. It may comprise for example a black-and-white camera for observing the reaction space and a pyrometer or a thermal imaging camera for determining the support body temperature.

The haze is preferably determined at at least two different points of measurement. This may be realized for example through the use of measuring apparatuses at different positions of the reactor. For example in the case of a fluidized bed reactor one camera may be oriented onto a region of the reaction space above the fluidized bed and one onto a region below the fluidized bed. Likewise in the case of a Siemens reactor thermal imaging cameras measuring rod temperatures at different silicon rods may be employed. A determination of haze at different sites in the reaction space is not strictly necessary since the particles are in principle uniformly distributed over the reaction space during dust deposition.

The haze may be determined continuously during the entire deposition or discontinuously at various times, preferably at identical time intervals, during the deposition. Determination of the haze is preferably carried out continuously to allow rapid intervention and particularly precise control of the deposition.

Further sensors which may generally detect a haze as a change in electromagnetic radiation incident on the sensor include: semiconductor sensors, for example CCD (charge-coupled device) sensors and CMOS sensors (active pixel sensor) and photoresistance (light dependent resistor).

Deposition is preferably interrupted or terminated upon exceeding a threshold value of haze. Termination may be contemplated for example when due to particularly severe dust deposition a high impurity level which cannot be removed by countermeasures is to be expected.

However, control of the deposition according to measured haze is preferable. This is especially effected by variation of typical parameters of the deposition.

It is preferable when upon exceeding or falling below a threshold value of haze at least one process parameter selected from the group comprising reactor pressure, support body temperature, volume flow (flow rate) and reaction gas composition is varied.

The support body temperature may be altered via the heat input into the support body via a closed-loop control circuit for example. Heat input in turn may be effected via electrical current which is introduced into the support body and converted into heat energy in a contacting manner via electrodes or contactlessly via electromagnetic induction. Heat input may further be introduced into the support body very largely contactlessly via electromagnetic radiation, especially by means of heat radiators. Output alteration of the abovementioned energy converters is typically effected using a current or frequency inverter arranged upstream of the energy converter and normally also using a rectifier transformer.

Control of the volume flow of the reaction gas or individual components of the reaction gas may be effected for example via the closed-loop control circuit of a flow measuring device, a controller and a control valve in the feed conduit to the reactor. The volume flow is typically measured before entry of the reaction gas into the reactor, for example according to DIN EN 1343.

The reaction gas composition may be altered for example via the flow control circuit of a further component of the reaction gas to the reactor (for example TCS, $H_2$).

Reactor pressure may be varied for example via the closed-loop control circuit of a pressure measurement means, a controller and a control valve installed in the offgas tract of the reactor.

The recited parameters are normally always displayed and optionally plotted at a process control station.

The deposition is preferably controlled such that during deposition the haze is substantially constant, in particular substantially equal to zero, or at least assumes a value close to zero. It is in principle desirable for no haze due to dust deposition to take place. However, it may depend on the quality demands on the polysilicon to be deposited whether dust deposition may be tolerated to a certain extent to reduce operating costs.

The term "substantially" is especially to be understood as meaning that temporary small deviations from the target value may occur. Reasons for this may include for example: responding variable variations in the process units arranged upstream and downstream of the reactor, responding variable variations in the reactor itself, an increase in the proportion of undesired silane components in the reaction gas.

The measuring apparatus is preferably coupled to a process control station. Control of the deposition may further be effected automatically in a closed-loop control circuit.

A further aspect of the invention relates to a gas phase deposition reactor for performing the process according to the invention comprising a measuring apparatus for determining the haze inside the reaction space during deposition. The measuring apparatus comprises a scattered radiation detector and/or extinction detector having at least one external source of electromagnetic radiation. The interaction of the radiation emitted by the source is determined using the detectors after a measurement path through the reaction space.

The gas phase deposition reactor is preferably a Siemens reactor or a fluidized bed reactor.

In respect of further embodiments of the reactor reference may be made to the above elucidations and the examples.

Figure 1:
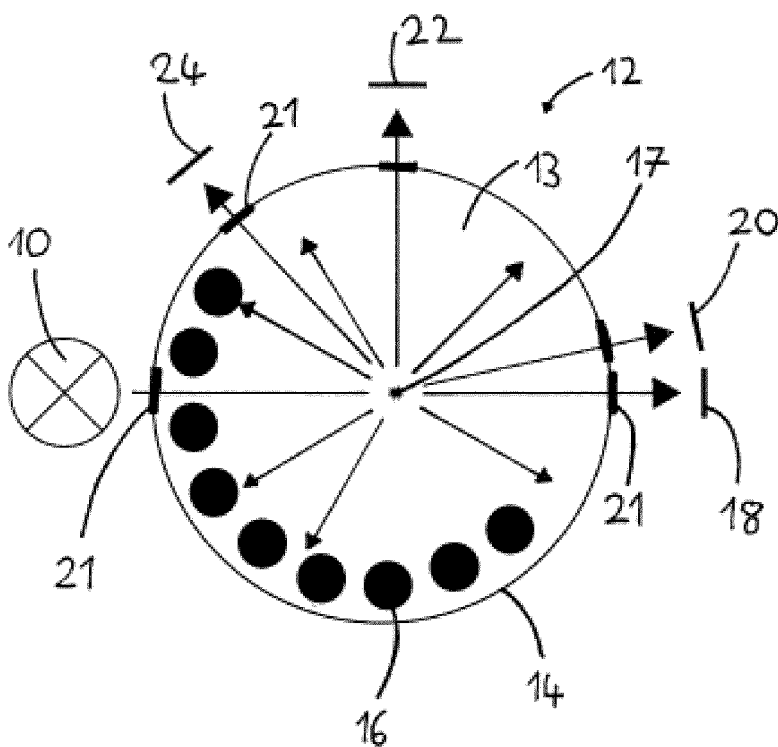
FIG. 1 shows the cross section of a gas phase deposition reactor for performing the process according to the invention.

FIG. 1 shows the cross section of a gas phase deposition reactor 12 according to the invention in whose reaction space 13, which is delimited by a reactor wall 14, support bodies 16 are arranged. The support bodies 16 are silicon rods and for reasons of clarity only a portion of the rods is shown.

For haze measurement in the reaction space 13 the reactor 12 is provided with a measuring apparatus. This comprises a separate source of electromagnetic radiation arranged in front of a sightglass 21, presently a light source 10 (laser of 515 nm oder 488 nm). It further comprises an extinction detector 18 arranged opposite the light source 10 and likewise in front of a sightglass 21 (made of borosilicate or quartz glass). Furthermore, scattered light detectors 20, 22, 24 (appropriate CCD sensor arrays) are positioned at various angles to the radiation direction of the light source 10 in each case in front of a sightglass 21. The scattered light detectors 20, 22, 24 need not necessarily be at the same height as the source 10.

During dust deposition particles 17 begin to form in the reaction space 13. Through absorption these attenuate the light emitted by the source 10. This is registered by the extinction detector 18. Particles 17 further bring about increasing light scattering as may be captured by the scattered light detectors 20, 22, 24. The measured values are typically captured by a process control station and optionally also compared with the reference/normal values. Countermeasures may then be taken on the basis of these measured values. Since during dust deposition the particles 17 are normally uniformly distributed over the reaction space 13, the height at which the detectors 20, 22, 24 and the source 10 are mounted is in principle immaterial. It is preferable when they are mounted at the height of the middle third of the silicon rod height.

Figure 2:
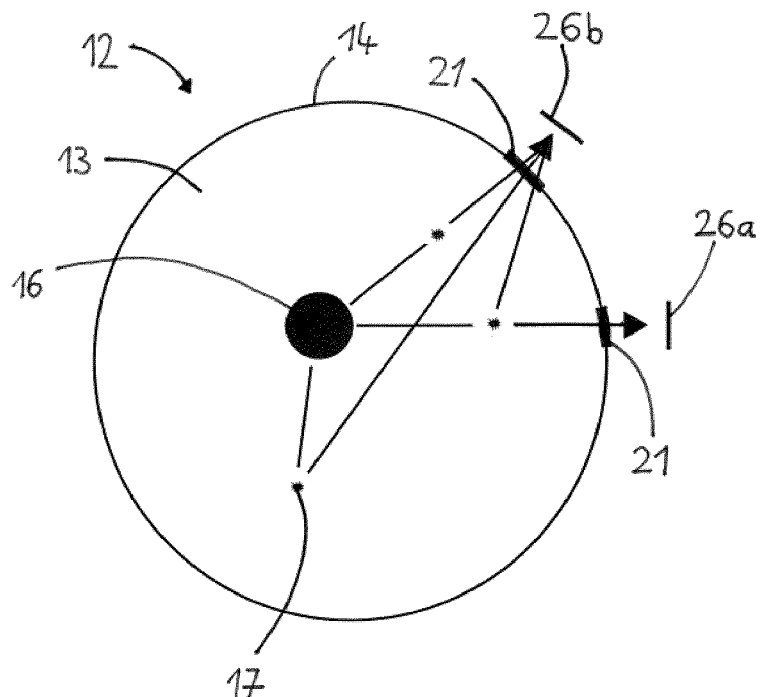
FIG. 2 shows the cross section of a gas phase deposition reactor for performing the process according to the invention.

FIG. 2 shows a gas phase deposition reactor 12 in cross section, wherein in respect of the substantial elements reference may be made to FIG. 1. For the sake of clarity only one heated silicon rod is shown as a radiation-emitting support body 16. In this embodiment two detectors 26a, 26b (for example photodiodes and/or photomultipliers) are arranged in the reactor wall in each case in front of a sightglass 21. The arrows indicate both light scattered by the particles 7 formed by dust deposition and light attenuated by absorption. Schematically only light attenuated by absorption is incident on the detector 26a while both scattered light and light attenuated by absorption is incident on the detector 26b. Haze is thus determined as a change in the radiation incident on the sensor.

EXAMPLE

Figure 3:
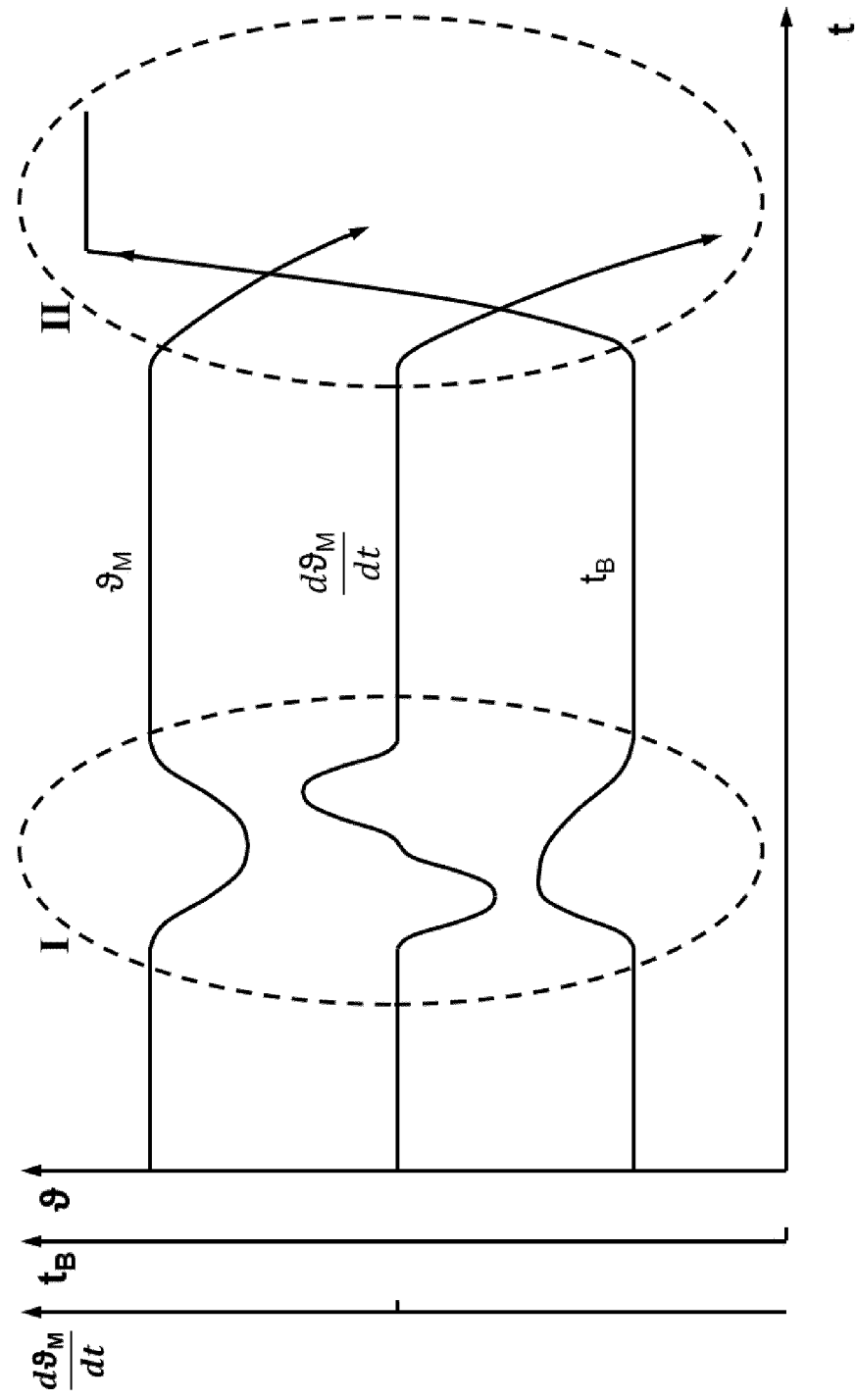
FIG. 3 shows the profile of temperature and exposure time in a dust deposition.

Plotted in FIG. 3 is a diagram of the profile of the measured support body temperature $\vartheta_M$, its first derivative with respect to time t and the exposure time $t_B$ of a black-and-white camera arranged in front of the sightglass of a Siemens reactor against t (deposition time). The profile shown commences at a deposition time of 60 hours.

The Siemens reactor was equipped with 24 rod pairs and the type of the reactor is in principle immaterial to the performance of the invention. Determination of $\vartheta_M$ was carried out on a polysilicon rod (at the height of the rod middle between the bridge and the electrode) with a pyrometer arranged in front of a sightglass. The data from the pyrometer were transferred to a process control station and plotted. The black-and-white camera was provided with a CMOS sensor and was likewise oriented into the reaction space approximately at the height of the rod middle. The camera continuously produced an image transferred to a processing software of the process control station. The software performed automatic adjustment of exposure time $t_B$ upon darkening or lightening.

After a deposition time of 60 hours $\vartheta_M$ initially remained constant at about 1040° C. After about 5 minutes there was an (apparent) fall of $\vartheta_M$ by about 12° C., wherein after about 4 minutes $\vartheta_M$ returned to the previous value. That this irregularity was a short dust deposition was confirmed by the rise (from 360 to 450 μs) and fall of $t_B$ over the same time window (region inside the dashed line I) since a dust deposition results in a darkening of the image.

The profile of $\vartheta_M$ in a dust deposition is in principle characterized in that the measured value changes more rapidly than would in fact be possible given the heat capacity of the silicon rods and the control path of the temperature control circuits. After a renewed phase of constancy (about 10 minutes) there was a significant fall in $\vartheta_M$ in conjunction with a steep rise in $t_B$. This abnormal curve profile was a complete dust deposition.

In a temporary dust deposition the process may recover when as a result of the gas flow more particles are discharged from the reactor via the exhaust gas than new particles are formed. However, when too many dust particles are formed in the reactor these can no longer be discharged from the reactor by the gas flow. When the reaction gas supply remains unchanged and heat input remains unchanged or is even increased, more dust particles are deposited than are blown out of the system and a permanent darkening of the reactor atmosphere results.

The irregularities in $\vartheta_M$ and $t_B$ especially make it possible to determine a haze index according to which countermeasures are then taken (manually or automatically) to prevent the dust deposition.

The invention claimed is:

1. A process for producing polycrystalline silicon, comprising:

introducing a reaction gas comprising silane and/or at least one halosilane as well as hydrogen into a reaction space of a gas phase deposition reactor, wherein the reaction space comprises at least one heated support body upon which by deposition silicon is deposited to form the polycrystalline silicon, wherein for detection of dust at least one measuring apparatus is used to determine haze inside the reaction space during the deposition by measuring the attenuation of the electromagnetic radiation emitted from the heated support body and/or by measuring the attenuation of the electromagnetic radiation emitted from an external source of electromagnetic radiation, wherein the external source emits radiation having wavelengths or a wavelength distinct from the wavelengths of an emission spectrum of silicon, wherein the attenuation is caused by absorption and/or by scattering and wherein the gas phase deposition reactor is a Siemens Reactor or a fluidized bed reactor, wherein the deposition is interrupted or terminated upon exceeding a threshold value of the haze or upon exceeding or falling below a threshold value of the haze as determined by at least one parameter selected from the group consisting of reactor pressure, support body temperature, reaction gas composition and volume flow is varied, and wherein the haze determined is a measure of an amount of particles within a reaction gas atmosphere within the reaction space of the gas phase deposition reactor.

2. The process of claim 1, wherein the measuring apparatus comprises a scattered radiation detector and/or extinction detector.

3. The process of claim 2, wherein the measuring apparatus further comprises an external source of electromagnetic radiation.

4. The process of claim 1, wherein the measuring apparatus comprises an optical camera; and wherein the haze is determined as a change in the images produced with the camera.

5. The process of claim 1, wherein the measuring apparatus comprises a temperature sensor; and wherein the haze is determined as a change in temperature.

6. The process of claim 5, wherein the temperature sensor is selected from the group consisting of pyrometer, thermal imaging camera, thermocouple and combinations thereof.

7. The process of claim 1, wherein the measuring apparatus is a combination of an optical camera and a temperature sensor.

8. The process of claim 1, wherein the haze is determined at, at least two different points of measurement.

9. The process of claim 1, wherein the haze is determined continuously during the entire deposition or discontinuously at various times during the deposition.

10. The process of claim 1, wherein the deposition is controlled such that during deposition the haze is substantially constant.

* * * * *